Dec. 2, 1952  F. E. MUNSCHAUER  2,620,054
FLUID ENGAGED AND SPRING RELEASED CLUTCH
Filed May 7, 1948
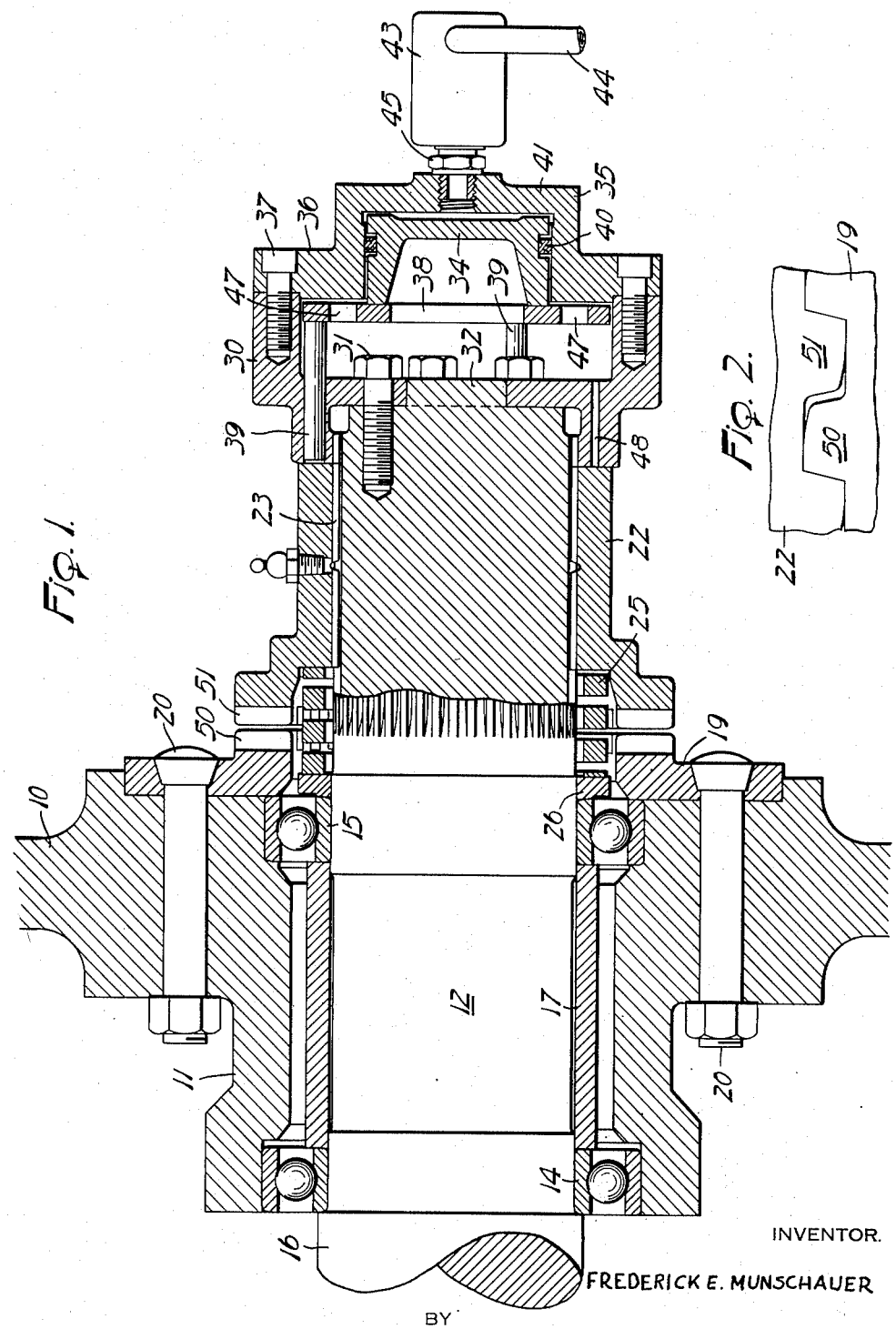
INVENTOR.
FREDERICK E. MUNSCHAUER
BY
Bean, Brooks, Buckley & Bean  ATTORNEYS.

Patented Dec. 2, 1952

2,620,054

UNITED STATES PATENT OFFICE 2,620,054

FLUID ENGAGED AND SPRING RELEASED CLUTCH

Frederick E. Munschauer, Buffalo, N. Y., assignor to Niagara Machine and Tool Works, Buffalo, N. Y.

Application May 7, 1948, Serial No. 25,632

1 Claim. (Cl. 192—85)

This invention relates to drive means for machinery and particularly to novel apparatus for connecting and disconnecting the driving and driven portions of machine power transmission mechanism.

The present invention is an improvement in the form of clutch mechanism disclosed in my prior Letters Patent No. 2,428,336, dated September 30, 1947.

While the principles of the present invention may be applied wherever the advantages inherent therein manifest themselves, its application will be discussed chiefly in connection with punch presses, power shears, and the like, where relatively high work output is required. In such machinery, positive drive means is highly desirable, and the present invention, in its primary form, provides such positive drive means under convenient fluid pressure control.

The various positive drive clutches of the prior art, other than those illustrated in the prior patent enumerated above, have been subject to high rates of wear, both as to the positive drive clutch elements themselves and as to the means employed for effecting connection and disconnection. According to the arrangement of the present invention, no substantial wear of the apparatus is met with, excepting that which is normal and natural at the jaws of the clutch elements proper, and the shape of the jaw teeth is such that wear thereon is minimized.

While general reference is made herein to fluid pressure operation, the usual source of fluid energy is compressed air. The present clutch mechanism is simpler in construction than those of the prior art and the arrangement is such that the action of the compressed air against the piston which engages the clutch is direct and immediate and, therefore, makes for faster clutch engagement and, in fact, also quicker disengagement.

According to the present invention, all parts of the clutch mechanism, excepting the flywheel, are stationary excepting when the flywheel or other drive wheel and the drive shaft are clutched for joint rotation. Further, when the clutch is disengaged the reaction of the compression coil spring which urges the clutch to disengaged position is borne by parts that are fixed relative to the drive shaft and not by the moving, air-operated, clutch-engaging parts. Since the clutch is usually disengaged for the major part of the time when the flywheel is running, this is a material factor and permits the parts which bear such reaction forces to be more generously proportioned than if they reciprocated during each clutch operation.

According to the construction of the present invention, the flywheel is mounted independently of all of the clutch parts, excepting of course the fixed jaw which is secured thereto, so that the clutch parts may be entirely removed without disturbing the flywheel, for servicing or for any other reason. The assembly is simple since the flywheel bearings, ball bearings in the illustrative example, and the entire mechanism are retained in proper axial assembly by the same screws which mount the fluid pressure cylinder adaptor to the drive shaft.

According to the present invention the driving faces of the clutch teeth are slightly angular so that there is a predetermined component tending to separate the clutch elements. This component is great enough to facilitate, and, in fact, greatly reduce the force necessary to separate the clutch elements at the end of an operating cycle when the working stroke is complete. The angle of the clutch faces may be such that this separating force component is not great enough to cause disengagement upon air failure during the working part of a stroke when the driving forces are greatest and there is enough frictional force in the spline connection, due to high torsional stress of the drive shaft, to overcome the separating force component of the clutch faces.

A single embodiment of the principles of the present invention is illustrated in the accompanying drawing and described in detail in the following specification. This embodiment is by way of example only and the present invention is not limited to that form or otherwise excepting as defined in the appended claim.

In the drawing:

Fig. 1 is a longitudinal fragmentary central cross-sectional view through one form of the device of the present invention; and Fig. 2 is an enlarged fragmentary side elevational view of the clutch elements proper showing the jaw tooth formation.

Like characters of reference denote like parts and the numeral 10 designates a flywheel, gear or other driving wheel element having a hub 11. Numeral 12 designates one end portion of a drive shaft which may comprise the crank shaft of a power press or similar machine wherein the shaft is to be intermittently or selectively rotated by connection with the flywheel or other driving wheel 10. While shaft 12 may comprise the crank shaft or eccentric shaft of a punch press, power shear, or like machine, it may be an intermediate shaft having further driving connection with the ultimate driven shaft of the machine.

A pair of anti-friction bearings 14 and 15 support flywheel 10, the inner race of bearing 14 being in abutment with an enlargement 16 of shaft 12 and the inner races of the two bearings being accurately spaced by means of a sleeve 17 extending therebetween. A jaw clutch element 19 is fixed to flywheel 10 and, in the illustrated instance, the flywheel is recessed to receive the clutch element, the latter being secured by means of bolts 20. A movable clutch element 22 of sleeve form has spline connection with shaft 12 as at 23, whereby it is fixed against rotation relative to shaft 12 but is axially movable thereon.

A compression coil spring 25 encircles shaft 12 and bears at one end against a washer 26, which, in turn, bears against the inner race of anti-friction bearing 15. The other end of spring 25 bears against an adjacent face of clutch element 22 to urge the latter to a position of disengagement with respect to clutch element 19, that being the position illustrated in Fig. 1. It will be noted that both ends of spring 25 act against portions of the mechanism which are fixed for rotation with shaft 12, and, therefore, spring 25 will always rotate with or remain stationary with shaft 12 and there are no running or wearing surfaces associated with the spring arrangement.

In the form of the present invention illustrated herein, an adaptor 30 which supports the entire fluid pressure clutch engaging mechanism is secured to the end of shaft 12 by means of screws 31, the shaft 12 having a reduced end portion 32 engaging in a complementary recess in adaptor 30 to accurately locate the same. A cylinder element 35 has an annular flange 36 which is secured against the outer face of adaptor 30 by means of screws 37.

Cylinder 35 receives a piston 34, whose skirt portion bears against a pressure plate 38, which, in turn, bears against a circularly arranged series of pins 39, in the present instance three, which are mounted in adaptor 30 for free axial sliding movement. Piston 34 is provided with packing means 40 and cylinder 35 has an end wall portion 41 to which is fastened a conventional rotary fluid connector 43. The body of the connector 43 remains stationary and is connected with a relatively stationary air pressure supply pipe 44, while an outlet stem portion 45 thereof is freely rotatable relative to the body. The interior details of the connector 43 are not illustrated since such devices are freely available commercially.

It is obvious that the application of air pressure through stem 45 to the interior of cylinder 35 will act against piston 34 and move the piston, the pressure plate 38, and pins 39 to the left as viewed in Fig. 1, thus moving clutch element 22 into engagement with clutch element 19 against the resistance of compression spring 25. Pressure plate 38 is provided with a series of openings 47 to avoid trapping air to the right of the pressure plate which would retard the releasing action of the clutch when air pressure is cut off. Also, a series of vent openings 48 permit egress of air from the interior of adaptor 30 when piston 34 moves to the left as viewed in Fig. 1.

It will be noted that the air pressure from stem 45 acts immediately and directly against the center of the head of piston 34, thus insuring the fastest possible response of clutch element 22 when the clutch is to be engaged.

Fig. 2 illustrates portions of clutch elements 19 and 22 in fragmentary elevation to show the preferred tooth profile. Referring to Fig. 2, driving and driven clutch elements 19 and 22, respectively, have interengaging teeth 50 and 51. It will be noted that the driving faces of teeth 50 and 51 are set at an angle to the driving axis. This introduces a force component of the driving torque which tends to force the elements 19 and 22 apart in an axial direction.

This component is materially less than the force of friction between the driving faces of the teeth when the drive shaft is under load, so that accidental failure of air pressure will not cause immediate clutch disengagement. However, the component may closely approach the force of friction present at the end of a press stroke when the drive shaft is under no working load to materially lessen the force required on the part of spring 25. This in turn greatly decreases the burden placed upon piston 34 in overcoming the resistance of spring 25 in clutch engaging operations. The foregoing arrangement reduces wear on the clutch teeth or jaws incident to clutch disengagement.

Spring 25 is pre-loaded by the assembling of clutch element 22 and adaptor 30 so that it acts at all times to retain the inner race of bearing 14 against abutment 16 and to retain the spacer sleeve 17 and bearing 15 in securely assembled relation.

The supply pipe 4 will, of course, have therein conventional control valve means which may selectively be manipulated at the will of the operator to apply or not apply air pressure to cylinder 41.

What is claimed is:

Drive means for power presses, shears and like machines comprising a drive shaft, a normally rotating drive wheel having independent anti-friction bearing on said shaft adjacent to but spaced inwardly of an end thereof, said bearing including a part fixed relative to the drive shaft and a part fixed relative to the wheel, a clutch element fixed against said wheel and facing said end of the drive shaft, an axially slidable complementary clutch element keyed to said drive shaft between the wheel and the end of the drive shaft, a compression coil spring disposed about the drive shaft with one end bearing against the bearing part fixed relative to the drive shaft and its other end bearing against the slidable clutch element to urge the same away from the fixed clutch element, a cylinder element including spaced radially extending end walls, one end wall being secured to said end of the drive shaft, a piston in said cylinder element and means for introducing fluid pressure between the other end of said cylinder element and said piston to selectively urge the latter toward said fixed clutch element against the urge of said coil spring, abutment means slidably mounted in said one cylinder end wall and engaging between the piston and said slidable clutch element to selectively move the latter to engaged position with the fixed clutch element under the impulse of said piston.

FREDERICK E. MUNSCHAUER.

REFERENCES CITED

The following references are of record in the file of this patent:

UNITED STATES PATENTS

| Number | Name | Date |
|---|---|---|
| 292,968 | Weston | Feb. 5, 1884 |
| 652,135 | McNair | June 19, 1900 |
| 746,761 | Taylor | Dec. 15, 1903 |
| 1,758,370 | Olsen et al. | May 13, 1930 |
| 1,836,773 | Salerni | Dec. 15, 1931 |
| 2,055,970 | Fippard | Sept. 29, 1936 |
| 2,120,092 | Doran | Jan. 7, 1938 |
| 2,257,006 | Hall | Sept. 23, 1941 |
| 2,428,336 | Munschauer | Sept. 30, 1947 |
| 2,493,495 | May | Jan. 30, 1950 |